United States Patent
Perera et al.

(10) Patent No.: US 12,140,088 B1
(45) Date of Patent: Nov. 12, 2024

(54) METHOD FOR DETECTING AND ANNUNCIATING GAS TURBINE ENGINE COMPRESSOR STALL

(71) Applicant: Pratt & Whitney Canada Corp., Longueuil (CA)

(72) Inventors: Ryan Perera, Mississauga (CA); Zubair Ahmad, Mississauga (CA); Fady Freiga, Aurora (CA); Safi Nizami, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/472,568

(22) Filed: Sep. 22, 2023

(51) Int. Cl.
| | | |
|---|---|---|
| *F02C 9/32* | (2006.01) | |
| *F02C 7/262* | (2006.01) | |
| *F02C 9/18* | (2006.01) | |
| *F02C 9/28* | (2006.01) | |
| *F02C 9/20* | (2006.01) | |

(52) U.S. Cl.
CPC .............. *F02C 9/32* (2013.01); *F02C 7/262* (2013.01); *F02C 9/18* (2013.01); *F02C 9/28* (2013.01); *F02C 9/20* (2013.01)

(58) Field of Classification Search
CPC ...... F02C 9/18; F02C 9/20; F02C 9/28; F02C 9/32; F02C 7/262
See application file for complete search history.

(56) References Cited

U.S. PATENT DOCUMENTS

| | | | | | |
|---|---|---|---|---|---|
| 3,830,055 | A | * | 8/1974 | Erlund | F02C 7/262 60/39.091 |
| 4,060,979 | A | * | 12/1977 | Elsaesser | F02C 7/00 60/773 |
| 4,060,980 | A | * | 12/1977 | Elsaesser | F04D 27/001 60/773 |
| 4,062,186 | A | * | 12/1977 | Snow | F02C 7/262 60/226.1 |
| 4,117,668 | A | * | 10/1978 | Elsaesser | F02C 7/00 60/773 |

(Continued)

FOREIGN PATENT DOCUMENTS

| | | |
|---|---|---|
| CN | 114235427 A | 3/2022 |
| JP | S5857098 A | 4/1983 |

*Primary Examiner* — William H Rodriguez
(74) *Attorney, Agent, or Firm* — Carlson, Gaskey & Olds, P.C.

(57) ABSTRACT

A gas turbine engine includes a propulsor, a compressor and a turbine section having a first turbine rotor connected to the compressor through a first shaft. A second turbine rotor is connected to at least the propulsor through a second shaft. The first turbine rotor drives the compressor at a first speed, and the second turbine rotor drives the propulsor at a second speed. There is a control for the gas turbine engine. The control is programmed to compare one of the first speed and the second speed to a commanded speed to determine a difference. The control also is programmed to identify a flame out condition, and identify a locked in stall condition when the difference between the two speeds exceeds a threshold for at least a threshold period of time at least in part concurrently with the flame out condition. The control is programmed to take a corrective action should the locked in stall condition be identified. A method is also disclosed.

20 Claims, 3 Drawing Sheets

(56) References Cited

U.S. PATENT DOCUMENTS

| | | | | |
|---|---|---|---|---|
| 4,136,517 A | * | 1/1979 | Brown | F02C 9/28 |
| | | | | 60/243 |
| 4,313,167 A | * | 1/1982 | Brown | F02C 9/28 |
| | | | | 701/100 |
| 4,622,808 A | * | 11/1986 | Kenison | F04D 27/0284 |
| | | | | 415/27 |
| 4,813,226 A | * | 3/1989 | Grosselfinger | F02C 9/50 |
| | | | | 60/39.27 |
| 4,825,639 A | * | 5/1989 | Krukoski | F04D 27/0207 |
| | | | | 60/773 |
| 5,022,224 A | * | 6/1991 | Smith | F02C 9/28 |
| | | | | 60/792 |
| 5,726,891 A | | 3/1998 | Sisson et al. | |
| 5,752,379 A | | 5/1998 | Schafer et al. | |
| 9,689,316 B1 | * | 6/2017 | Crom | F02C 9/26 |
| 10,633,105 B2 | | 4/2020 | Hedrick | |
| 2001/0045088 A1 | * | 11/2001 | Sugitani | F02C 9/28 |
| | | | | 60/39.281 |
| 2008/0095609 A1 | * | 4/2008 | Block | F01D 21/02 |
| | | | | 415/30 |
| 2010/0017093 A1 | * | 1/2010 | Mahmood | F01D 11/24 |
| | | | | 701/100 |
| 2015/0176499 A1 | * | 6/2015 | Balcer | F01D 21/14 |
| | | | | 415/26 |
| 2015/0219528 A1 | * | 8/2015 | Djelassi | G01M 15/14 |
| | | | | 702/44 |

* cited by examiner

METHOD FOR DETECTING AND ANNUNCIATING GAS TURBINE ENGINE COMPRESSOR STALL

BACKGROUND

This relates to a method and apparatus for detecting stall conditions in the compressor of a gas turbine engine.

Gas turbine engines are known, and typically include a propulsor, such as a fan delivering air into a compressor. The air is compressed in the compressor and delivered into a combustor. Products of the combustion pass downstream over turbine rotors driving them to rotate. The turbine rotors in turn drive compressor and fan rotors.

Gas turbine engines raise a number of challenges. One challenge is a compressor stall or surge condition. If a stall condition persists in the compressor for a period of time, the condition is known as "locked in stall."; also known as a "rotating stall" or a "rolling stall".

When a locked in stall condition occurs, an engine loses power. Typically a throttle reduction is suggested to increase chance of recovery from a locked in stall. However, pilot reaction time can sometimes be undesirably long, since the pilot must determine a locked in stall condition before taking the corrective action. This presents challenges as prolonged times to react can result in engine over-temperature and period with loss of engine thrust.

SUMMARY

A gas turbine engine includes a propulsor, a compressor and a turbine section having a first turbine rotor connected to the compressor through a first shaft. A second turbine rotor is connected to at least the propulsor through a second shaft. The first turbine rotor drives the compressor at a first speed, and the second turbine rotor drives the propulsor at a second speed. There is a control for the gas turbine engine. The control is programmed to compare one of the first speed and the second speed to a commanded speed to determine a difference. The control also is programmed to identify a flame out condition, and identify a locked in stall condition when the difference between the two speeds exceeds a threshold for at least a threshold period of time at least in part concurrently with the flame out condition. The control is programmed to take a corrective action should the locked in stall condition be identified.

A method of operating a gas turbine engine includes operating a propulsor, a compressor and a turbine section having a first turbine rotor driving the compressor. A second turbine rotor drives at least the propulsor. The first turbine rotor drives the compressor through a first shaft at a first speed. The second turbine rotor drives the propulsor through a second shaft at a second speed. One of the first speed and the second speed is compared to a commanded speed and determines a difference and identifies a flame out condition. A locked in stall condition is identified if the difference between the two speeds exceeds a threshold for at least a threshold period of time at least in part concurrently with the flame out condition. A corrective action is taken should the locked in stall condition be identified.

These and other features will be best understood from the following drawings and specification, the following is a brief description.

DETAILED DESCRIPTION

Figure 1:
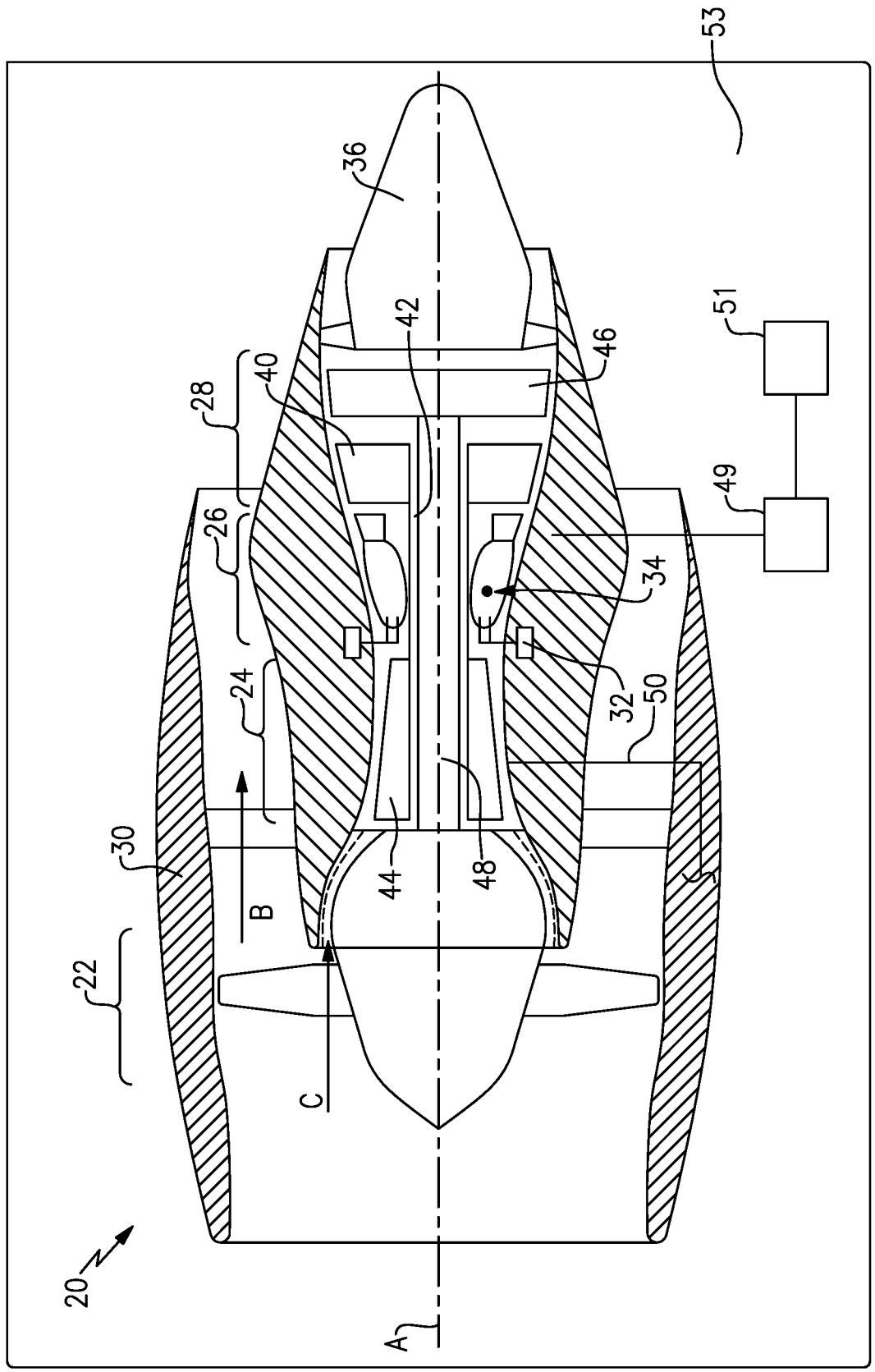
FIG. 1 schematically shows a gas turbine engine and associated aircraft.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The fan section 22 also delivers air along a core flow path C into the compressor section 24 for compression and into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller (i.e. turboprop), or a turbojet, turboshaft or Auxiliary Power Unit (APU). This embodiment can also be applied to industrial gas turbine engine as well.

The engine 20 is shown to have a high speed turbine rotor 40 driving a high speed shaft 42 to in turn drive a compressor rotor 44. A low speed turbine 46 drives a low speed shaft 48 to in turn drive the fan 22. The high speed turbine 40, shaft 42, and compressor 44 can be referred to as a high speed spool. The high speed spool rotational speed is typically known as N2. Similarly, the low speed turbine 46, shaft 48 and fan rotor 22 are known as a low speed spool. The low speed spool rotational speed is typically known as N1. While low speed spool is only shown driving the fan rotor, gas turbine engines may also have the low speed spool driving a low speed compressor.

A de-icing system 50 for the nacelle 30 is shown schematically. As known, compressed air is tapped from the compressor 44 and delivered into the nacelle 30 for de-icing purposes. This system may be as known.

In addition, a controller 49 typically known as a full authority digital electronic controller ("FADEC") is shown controlling the engine. The FADEC 49 also communicates with a warning system 51 in a cockpit of an associated aircraft, shown schematically as box 53.

Figure 2:
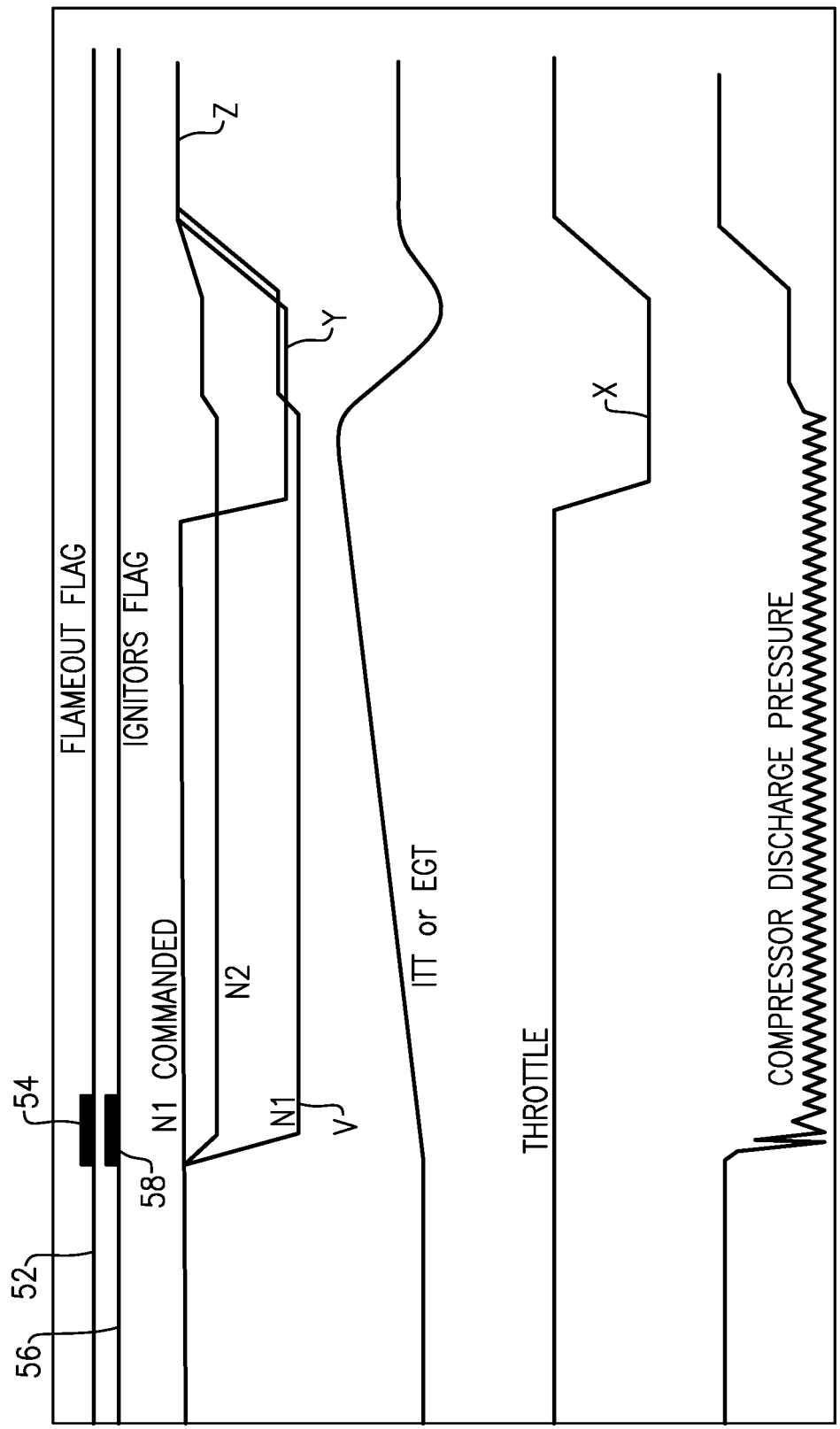
FIG. 2 is a chart showing operational characteristics of a gas turbine engine during a locked in stall incident, and after correction.

As mentioned above, under certain conditions an aircraft engine may be subject to locked in stall. Such an incident is shown in FIG. 2. FIG. 2 is a graph of several variables across a period of time. There is a flame out indicator 52 having a flag at point 54. The flag may be set when the FADEC 49 determines that a flame out may have occurred. There is also an ignitors line 56 having a flag 58. Typically during a stall, there will be a flame out indication.

In the event of an engine surge, the flameout indication is a false positive. Early indicators of a flameout and surge are similar, rapid loss of power/thrust due to sudden loss of high spool speed (N2) and loss of compressor exit pressure. Determining a flameout quickly is desirable which is why it's common for a flameout flag to turn on when a surge initially occurs.

In a typical surge event, a flameout indication usually occurs where the FADEC turns on the flameout flag. If the flameout flag is not available on the data stream however then a substitute may be used which coincides with the flameout flag such as the ignitor flag.

In a more general way, the flameout flag or an equivalent indicator (in this case the ignitor flag) or any other flag based on a drop in N1/N2, compressor discharge pressure, engine power or thrust, may be interpreted as a flameout indicator.

In fact, the equivalent indicator could be any indication of a loss of power/speed indicator. For purposes of this application, any of these can be taken as identifying a flame out condition.

There are three speed lines N1 COMMANDED, which is a commanded N1 speed, N2 and N1 actual. At point V there is a large difference between N1 actual and N1 Commanded. This would also be indicative of a locked in stall condition.

If a flame out indicator is sensed, and the difference between the N1 actual and N1 Commanded is greater than a predetermined maximum for a minimum period of time, say twenty seconds, then the FADEC 49 will make a determination that a locked in stall condition is occurring, and take proactive action.

The flame out condition flag 54 also is preferably found to be within a maximum period of time from the location V where the speed difference is determined. As an example, the maximum period of time may be within thirty seconds. Further, the FADEC will also be programmed to avoid false positives by checking to make sure the engine starting and engine shutdown parameters are not occurring, or are false.

As one corrective action, the FADEC 49 can send a warning signal to system 51 that a locked in stall condition is occurring. The pilot would then know to take the corrective action of reducing the throttle position, which in turn would reduce fuel flow and/or open the engine Bleed Off Valves (BOVs). This is shown at point X. When this occurs, one can see N1 Commanded also drops at point Y. This should correct the locked in stall condition such that by point Z N1 actual and N1 Commanded are within the predetermined maximum difference.

Other corrective actions may include the FADEC 49 automatically reducing the fuel level to correct the locked in stall. Additionally, or as an alternative, the bleeding of compressor air into the anti-ice system 50, or overboard may occur which would help unload the compressor. This can also reduce or eliminate a locked in stall condition.

FIG. 2 also shows the engine Inter Turbine Temperature (ITT) rising with the locked in stall condition, and then dropping with the correction at point Z.

When surge occurs, the efficiency of the compressor drops and results in lower compressor spool speeds (N1 & N2). This results in less air being supplied to the combustor and thus the combustor is now fuel rich which results in increased temperature. This is also why reducing the throttle is desired during surge so that the FADEC can reduce fuel flow Conditions that the FADEC 49 may utilize to determine a flame out condition would be a rate of change of N2 such that the N2 speed is dropping too quickly. It at may also involve a rapid drop in Compressor Exit Pressure.

In addition, a compressor exit temperature may be looked at to determine a flame out condition. If Inter Turbine Temperature (ITT) and/or Exhaust Gas Temperature (EGT) is lower than would be expected this is indicative of a flame out condition.

Figure 3:
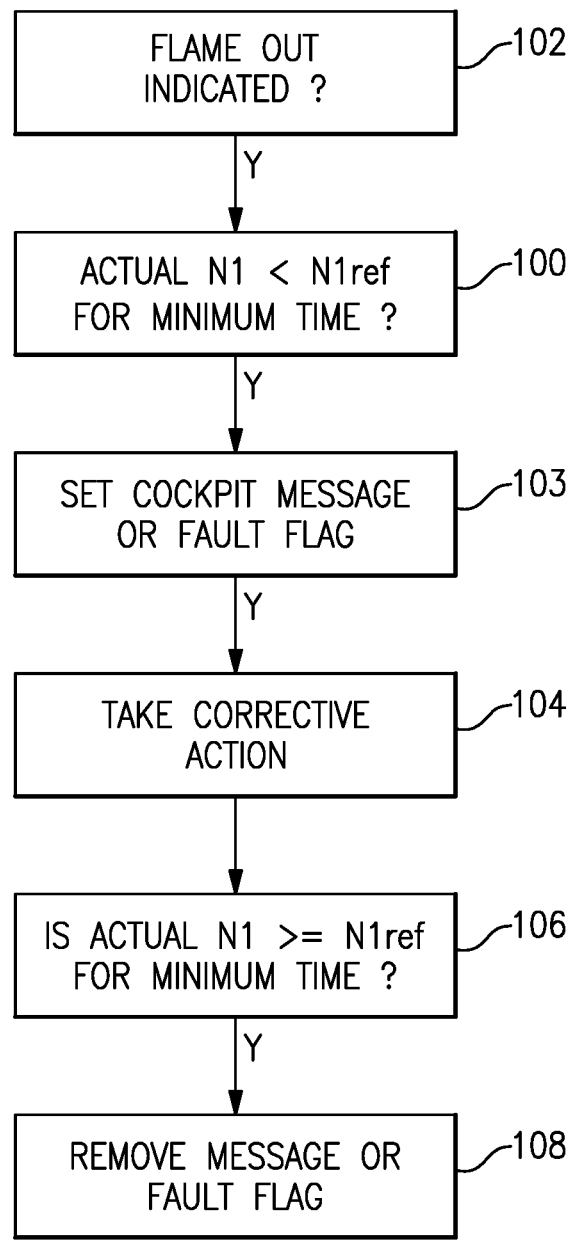
FIG. 3 is a flow chart of a method according to this disclosure.

A flow chart of a method according to this disclosure is shown in FIG. 3. At step 102 a FADEC asks whether a flame out is indicated. If yes, at step 100 the FADEC asks whether actual N1 is less than N1 COMMANDED by a predetermined amount for a minimum period of time. If the answer to steps 1 and 2 are both yes within a predetermined maximum time period, then at step 103 a cockpit message or fault flag is set.

At step 104 a corrective action is taken. At step 106 the FADEC asks is actual N1≥N1 REF for a minimum time? If the answer is yes then at step 108 the message or fault flag is removed.

While the N1 difference is specifically disclosed, a similar difference in any actual spool speed and their commanded spool speed can be used (example, N2 actual and N2 commanded).

A gas turbine engine under this disclosure could be said to include a propulsor 22, a compressor 24 and a turbine section 28 having a first turbine rotor 42 connecting to the compressor through a first shaft. A second turbine rotor 46 connects to at least the propulsor through a second shaft. The first turbine rotor drives the compressor at a first speed, and the second turbine rotor drives the propulsor at a second speed. It should be understood both turbine rotors may drive a single blade row or plural blade rows. A control 49 for the gas turbine engine is programmed to compare one of the first speed and the second speed to a commanded speed to determine a difference. The control also is programmed to identify a flame out condition, and identify a locked in stall condition when the difference between the two speeds exceeds a threshold for at least a threshold period of time at least in part concurrently with the flame out condition. The control is programmed to take a corrective action 51 should the locked in stall condition be identified.

In another embodiment according to the previous embodiment, the first speed is utilized to compare to the commanded first speed.

In another embodiment according to any of the previous embodiments, the control is connected to communicate with a pilot warning device 51, and the corrective action is advising the pilot to take a corrective action.

In another embodiment according to any of the previous embodiments, the corrective action is the pilot reducing a throttle position.

In another embodiment according to any of the previous embodiments, the corrective action is the pilot actuating an anti-ice system 50 for tapping compressed air from the compressor.

In another embodiment according to any of the previous embodiments, the identified flame out condition must be within a maximum period of time from the identification of the difference between the commanded shaft speed and actual shaft speed exceeding the predetermined maximum for the locked in stall to be identified.

In another embodiment according to any of the previous embodiments, the control not taking corrective action should there be an indication that the engine is starting or being shut down.

In another embodiment according to any of the previous embodiments, the control 49 communicates with a pilot warning device 51, and the corrective action is advising the pilot to take a corrective action.

In another embodiment according to any of the previous embodiments, the corrective action is the pilot reducing a throttle position.

In another embodiment according to any of the previous embodiments, the corrective action is the pilot actuating an anti-ice system for tapping compressed air from the compressor.

A method of operating a gas turbine engine under this disclosure could be said to include the steps of operating a propulsor 22, a compressor 24 and a turbine section 28 having a first turbine rotor 42 driving the compressor, and a second turbine rotor 46 driving at least the propulsor, the first turbine rotor drives the compressor through a first shaft at a first speed, and the second turbine rotor drives the propulsor through a second shaft at a second speed. One of the first speed and the second speed is compared to a commanded speed and determines a difference and identifying a flame out condition, and identifying a locked in stall condition if the difference between the two speeds exceeds a threshold for at least a threshold period of time at least in part concurrently with the flame out condition. A corrective action is taken should the locked in stall condition be identified.

In another embodiment according to any of the previous embodiments, the first speed is compared to the commanded first speed.

In another embodiment according to any of the previous embodiments, the corrective action is communicating with a pilot warning device.

In another embodiment according to any of the previous embodiments, the corrective action is the pilot reducing a throttle position.

In another embodiment according to any of the previous embodiments, the corrective action is also the pilot actuating an anti-ice system 50 for tapping compressed air from the compressor.

In another embodiment according to any of the previous embodiments, the identified flame out condition must be within a maximum period of time from the identification of the difference between the commanded shaft speed and actual shaft speed exceeding the predetermined maximum for the locked in stall to be identified.

In another embodiment according to any of the previous embodiments, includes the step of not taking corrective action should there be an indication that the engine is starting or being shut down.

In another embodiment according to any of the previous embodiments, the corrective action is communicating with a pilot warning device 51.

In another embodiment according to any of the previous embodiments, the corrective action is also the pilot reducing a throttle position.

In another embodiment according to any of the previous embodiments, the corrective action is also the pilot actuating an anti-ice system 50 for tapping compressed air from the compressor.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:
   a propulsor, a compressor and a turbine section having a first turbine rotor connected to the compressor through a first shaft, and a second turbine rotor connected to at least the propulsor through a second shaft, the first turbine rotor for driving the compressor at a first speed, and the second turbine rotor for driving the propulsor at a second speed;
   a control for the gas turbine engine, the control being programmed to compare one of the first speed and the second speed to a commanded speed to determine a difference, the control also being programmed to identify a flame out condition, and identify a locked in stall condition when the difference between the two speeds exceeds a threshold for at least a threshold period of time at least in part concurrently with the flame out condition; and
   the control being programmed to take a corrective action should the locked in stall condition be identified.

2. The gas turbine as set forth in claim 1, wherein the first speed is utilized to compare to the commanded first speed.

3. The gas turbine engine as set forth in claim 2, wherein the control connected to communicate with a pilot warning device, and the corrective action being advising the pilot to take a corrective action.

4. The gas turbine engine as set forth in claim 3, wherein the corrective action is the pilot reducing a throttle position.

5. The gas turbine engine as set forth in claim 3, wherein the corrective action is the pilot actuating an anti-ice system for tapping compressed air from the compressor.

6. The gas turbine engine as set forth in claim 5, wherein the identified flame out condition must be within a maximum period of time from the identification of the difference between the commanded shaft speed and actual shaft speed exceeding the predetermined maximum for the locked in stall to be identified.

7. The gas turbine engine as set forth in claim 1, wherein the control not taking corrective action should there be an indication that the engine is starting or being shut down.

8. The gas turbine engine as set forth in claim 1, wherein the control communicating with a pilot warning device, and the corrective action being advising the pilot to take a corrective action.

9. The gas turbine engine as set forth in claim 8, wherein the corrective action is the pilot reducing a throttle position.

10. The gas turbine engine as set forth in claim 8, wherein the corrective action is the pilot actuating an anti-ice system for tapping compressed air from the compressor.

11. A method of operating a gas turbine engine comprising the steps of:
    operating a propulsor, a compressor and a turbine section having a first turbine rotor driving the compressor, and a second turbine rotor driving at least the propulsor, the first turbine rotor drives the compressor through a first shaft at a first speed, and the second turbine rotor drives the propulsor through a second shaft at a second speed;
    comparing one of the first speed and the second speed to a commanded speed and determining a difference and identifying a flame out condition, and identifying a locked in stall condition if the difference between the two speeds exceeds a threshold for at least a threshold period of time at least in part concurrently with the flame out condition; and
    taking a corrective action should the locked in stall condition be identified.

12. The method as set forth in claim 11, wherein the first speed is compared to the commanded first speed.

13. The method as set forth in claim 12, wherein the corrective action is communicating with a pilot warning device.

14. The method as set forth in claim 13, wherein the corrective action is the pilot reducing a throttle position.

15. The method as set forth in claim 13, wherein the corrective action is also the pilot actuating an anti-ice system for tapping compressed air from the compressor.

16. The method as set forth in claim 15, wherein the identified flame out condition must be within a maximum period of time from the identification of the difference between the commanded shaft speed and actual shaft speed exceeding the predetermined maximum for the locked in stall to be identified.

17. The method as set forth in claim 11, including the step of not taking corrective action should there be an indication that the engine is starting or being shut down.

18. The method as set forth in claim 11, wherein the corrective action is communicating with a pilot warning device.

19. The method as set forth in claim 18, wherein the corrective action is also the pilot reducing a throttle position.

20. The method as set forth in claim 18, wherein the corrective action is also the pilot actuating an anti-ice system for tapping compressed air from the compressor.

\* \* \* \* \*